(12) United States Patent
Park

(10) Patent No.: US 8,893,864 B2
(45) Date of Patent: Nov. 25, 2014

(54) FREQUENCY UNIT VALVE

(71) Applicant: Mando Corporation, Gyeonggi-do (KR)

(72) Inventor: Wan Sang Park, Jeollabuk-do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 20 days.

(21) Appl. No.: 13/645,023

(22) Filed: Oct. 4, 2012

(65) Prior Publication Data

US 2013/0240765 A1 Sep. 19, 2013

(30) Foreign Application Priority Data

Mar. 13, 2012 (KR) .................. 10-2012-0025611

(51) Int. Cl.
*F16F 9/34* (2006.01)

(52) U.S. Cl.
USPC ...... 188/322.13; 188/281; 188/286; 188/304; 188/322.15

(58) Field of Classification Search
USPC ............... 188/322.13, 275, 280, 281, 282.1, 188/282.5, 282.6, 282.8, 283, 284, 286, 188/304, 316, 317, 322.15
See application file for complete search history.

(56) References Cited

U.S. PATENT DOCUMENTS

| 3,896,908 | A | * | 7/1975 | Petrak | 188/280 |
| 5,248,014 | A | * | 9/1993 | Ashiba | 188/282.8 |
| 5,368,142 | A | * | 11/1994 | Ashiba et al. | 188/282.1 |
| 6,561,326 | B2 | * | 5/2003 | Gotz | 188/322.15 |
| 2005/0011712 | A1 | * | 1/2005 | Gotz et al. | 188/298 |
| 2006/0283675 | A1 | * | 12/2006 | Teraoka et al. | 188/298 |
| 2013/0140117 | A1 | * | 6/2013 | Yu | 188/280 |

FOREIGN PATENT DOCUMENTS

JP 2008215460 A * 9/2008

* cited by examiner

*Primary Examiner* — Pamela Rodriguez
(74) *Attorney, Agent, or Firm* — McDermott Will & Emery LLP

(57) ABSTRACT

A frequency unit valve is provided. In the frequency valve, a free piston reciprocates within a housing where a sub-valve is mounted in a lower portion. Variable frequency units installed above and under the free piston provide a damping characteristic by selectively opening or closing a passage when a frequency of a piston rod is in a high-frequency region and a low-frequency region. Accordingly, the vehicle ride comfort is maximally improved.

14 Claims, 1 Drawing Sheet

FREQUENCY UNIT VALVE

CROSS-REFERENCE(S) TO RELATED APPLICATION

This application claims priority of Korean Patent Application No. 10-2012-0025611, filed on Mar. 13, 2012, in the Korean Intellectual Property Office, which is hereby incorporated by reference in its entirety.

BACKGROUND OF THE INVENTION

1. Field of the Invention

The present invention relates to a frequency unit valve, and more particularly, to a frequency unit valve that is capable of maximally improving a vehicle ride comfort.

2. Description of the Related Art

A shock absorber for a vehicle is mounted on front and rear wheels of the vehicle and absorbs vibration transferred from a road, improving the steering stability and ride comfort. A shock absorber has a piston valve opening/closing structure that forms a passage with a complicated shape to provide various nonlinear damping forces according to an operating speed of a wheel.

In order to improve the ride comfort, the shock absorber for the vehicle allows an oil discharge by mounting a damper in an end portion of a piston rod and mounting a sub-valve in a lower portion of the damper and a free piston moving vertically inside the damper.

Therefore, while the free piston reciprocates within the damper, the operation characteristic of the entire valve system, including the damper, the free piston, and the sub-valve, is changed.

In most valve systems manufactured so far, oil flowing into a damper through a piston rod defines an up stroke and a down stroke of a free piston. However, when a frequency according to the reciprocation of the piston rod is in a high-frequency region, such valve systems may not sufficiently provide an additional damping force. Therefore, problems such as pressure pulsation have not been perfectly solved.

CITATION LIST

Patent Literature

U.S. Patent Publication No. 2005/0011712
Japanese Patent Application Laid-Open No. 2008-215460
Japanese Patent Application Laid-Open No. 2008-215461
Japanese Patent Application Laid-Open No. 2008-240764
Japanese Patent Application Laid-Open No. 2010-196842

SUMMARY OF THE INVENTION

An aspect of the present invention is directed to provide a frequency unit valve that is capable of maximally improving a vehicle ride comfort.

According to an embodiment of the present invention, a frequency unit valve includes: a housing communicating with a piston rod and forming an inner space, both ends of the housing being opened; a free piston slidably mounted on an inner peripheral surface of the housing and partitioning the inner space of the housing into an upper chamber and a lower chamber; a sub-valve mounted in a lower portion of the housing and allowing oil to be passed to the outside of the housing according to the sliding of the free piston; and variable frequency units installed above and under the free piston, and configured to close an oil passage of the upper and lower chambers when a frequency of the piston rod is in a high-frequency region, and open the oil passage of the upper and lower chambers through the free piston when the frequency of the piston rod is in a low-frequency region.

The free piston may include: a body having an opened lower side and forming an inner space, the body being configured to move vertically within the housing according to reciprocation of the piston rod; a sliding flange extending from an outer peripheral surface of the body and contacting the inner peripheral surface of the housing; and a disk sheet spaced apart from the outer peripheral surface of the body on the sliding flange and protruding in a ring shape, wherein the variable frequency units are installed above and under the body with reference to the sliding flange.

The free piston may further include a communication hole that passes through the body to communicate with the inner space and is disposed at a position lower than an upper portion of the disk sheet, and an operating range of the variable frequency unit installed above the body may be from an upper portion of the body to the upper portion of the disk sheet.

The variable frequency unit may include: a first coil spring disposed between an inner upper portion of the housing and an upper portion of the body; a second coil spring disposed between an upper portion of the sub-valve and a lower portion of the body; a ring disk mounted in a lower portion of the first coil spring, and configured to allow or prevent mutual communication between the upper chamber and the lower chamber while moving vertically along an outside of a central portion of the free piston; and a third coil spring mounted between a bottom of the ring disk and the free piston, and configured to elastically support the ring disk.

The variable frequency unit may include: a first coil spring mounted in an inner upper portion of the housing and configured to elastically support the body from an upper side; a second coil spring mounted in an inner lower portion of the housing and configured to elastically support the body from a lower side; a ring disk contacting a lower portion of the first coil spring and vertically moving to the disk sheet along the outer peripheral surface of the body while interworking with reciprocation of the piston rod; and a third coil spring installed on the sliding flange, and configured to elastically support the ring disk.

The free piston may further include a communication hole that passes through the body to communicate with the inside of the housing and is disposed at a position lower than an upper portion of the disk sheet. When the frequency of the piston rod is in the high-frequency region, the ring disk may contact the disk sheet and prevent mutual communication between the upper and lower chambers of the housing. When the frequency of the piston rod is in the low-frequency region, the ring disk may be separated from the disk sheet and allow mutual communication between the upper and lower chambers of the housing through the communication hole.

When the frequency of the piston rod is in the high-frequency region, a force of the first coil spring of the variable frequency unit may be stronger than a force of the third coil spring thereof.

When the frequency of the piston rod is in the low-frequency region, a force of the third coil spring of the variable frequency unit may be stronger than a force of the first coil spring thereof.

The housing may include holes that open or close the passage at different heights according to the vertical movement of the free piston interworking with reciprocation of the piston rod, and all of the holes may communicate with the lower chamber side partitioned by the free piston.

When the frequency of the piston rod is in the high-frequency region, the free piston may allow all of the holes to be opened so that oil is discharged to the outside of the housing.

When the frequency of the piston rod is in the low-frequency region, the free piston may close a part or all of the holes so that an amount of oil discharged to the outside of the housing is reduced.

The first coil spring may be gradually widened toward an upper side, and the second coil spring may be gradually widened toward a lower side.

<Description of Reference Numerals>

| | |
|---|---|
| 100 housing | 200 free piston |
| 300 sub-valve | 400 variable frequency unit |
| 500 piston rod | |

DETAILED DESCRIPTION OF EXEMPLARY EMBODIMENTS

Exemplary embodiments of the present invention will be described below in detail with reference to the accompanying drawings.

Figure 1:
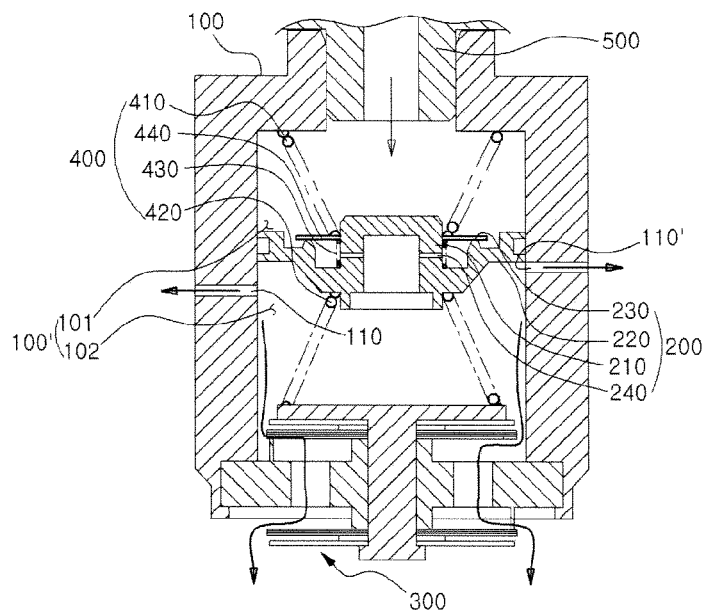
FIGS. 1 and 2 are sectional conceptual diagrams showing an operating state of a frequency unit valve according to an embodiment of the present invention.
Figure 2:
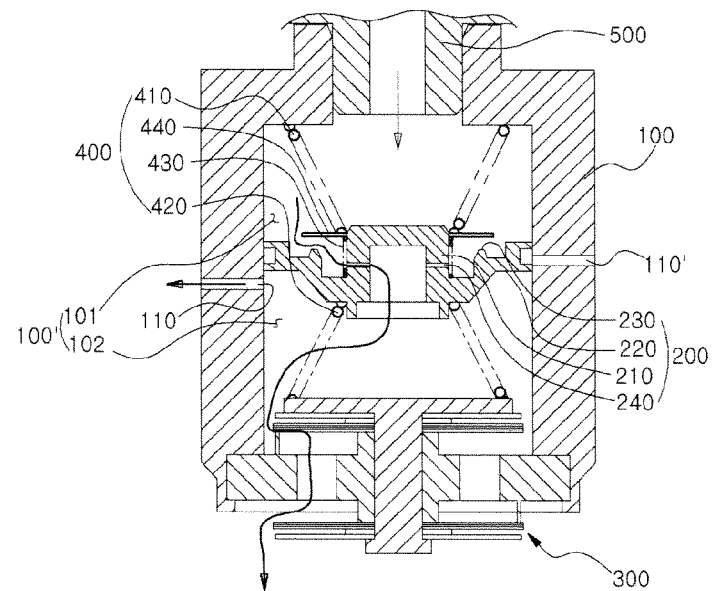

FIGS. 1 and 2 are sectional conceptual diagrams showing an operating state of a frequency unit valve according to an embodiment of the present invention.

As shown in FIGS. 1 and 2, a sub-valve 300 is mounted in a lower portion of a housing 100, and a free piston 200 reciprocates within the housing 100. When a frequency of a piston rod 500 is in high-frequency and low-frequency region, a damping characteristic is provided by selectively opening or closing a passage by variable frequency units 400 mounted above and under the free piston 200.

The housing 100 communicates with the piston rod 500 and has an inner space 100', and both ends of the housing 100 are opened. The housing 100 serves as a damper body.

The free piston 200 is slidably mounted on the inner peripheral surface of the housing 100, and partitions the inner space of the housing 100 into an upper chamber 101 and a lower chamber 102. The free piston 200 is a member that operates with oil introduced by the reciprocation of the piston rod 500.

The sub-valve 300 is mounted in a lower portion of the housing 100, and allows oil to be passed toward the outside of the housing 100 according to the sliding of the free piston 200.

The variable frequency units 400 are mounted above and under the free piston 200, and are configured to close the oil passage of the upper and lower chambers 101 and 102 when the frequency of the piston rod 500 is in the high-frequency region and to open the oil passage of the upper and lower chambers 101 and 102 through the free piston 200 when the frequency of the piston rod 500 is in the low-frequency region.

It is apparent that the following various embodiments as well as the above-described embodiment can also be applied to the present invention.

As described above, the free piston 200 is a member that interworks with the operation of the piston rod 500, and includes a body 210, a sliding flange 220, and a disk sheet 230.

The body 210 has an opened lower side and has an inner space. Thus, the body 210 communicates with the inner space 100' of the housing 100 and moves vertically within the housing 100 according to the reciprocation of the piston rod 500.

The sliding flange 220 extends from the outer peripheral surface of the body 210 and contacts the inner peripheral surface of the housing 100. The sliding flange 220 performs a substantial sliding motion.

The disk sheet 230 is spaced apart from the outer peripheral surface of the body 210 on the sliding flange 220 and protrudes in a ring shape. The disk sheet 230 provides a space necessary for the operation of the variable frequency units 400, which will be described later.

The variable frequency units 400 are mounted above and under the body 210 with reference to the sliding flange 220.

In this case, the free piston 200 may further include a communication hole 240 that passes through the body 210 to communicate with the inner space 100' and is disposed at a position lower than the upper portion of the disk sheet 230.

As will be described later, the communication hole 240 serves as a communication passage that communicates the upper and lower chambers 101 and 102 with each other when the frequency of the piston rod 500 is in the low-frequency region.

In addition, the operating range of the variable frequency unit 400 mounted above the body 210 is from the upper portion of the body 210 to the upper portion of the disk sheet 230.

Meanwhile, as described above, the variable frequency units 400 allow or prevent the communication between the upper and lower chambers 101 and 102 according to whether the frequency of the piston rod 500 is in the high-frequency region or the low-frequency k. Each of the variable frequency units 400 includes a first coil spring 410, a second coil spring 420, a third coil spring 430, and a ring disk 440.

The first coil spring 410 is disposed between the inner upper portion of the housing 100 and the upper side of the body 210.

That is, the first coil spring 410 is mounted in the inner upper portion of the housing 100 and elastically supports the body 210 from the upper side. It is preferable that the first coil spring 410 be a cone type coil spring, which is gradually widened toward the upper side, so as to improve the ride comfort and ensure the degree of freedom according to the elastic deformation.

The second coil spring 420 is disposed between the upper side of the sub-valve 300 and the lower side of the body 210.

That is, the second coil spring 420 is mounted in the inner lower portion of the housing 100 and elastically supports the body 210 from the lower side. It is preferable that the second coil spring 420 be a cone type coil spring, which is gradually widened toward the lower side, so as to improve the ride comfort and ensure the degree of freedom according to the elastic deformation.

The ring disk 440 is mounted in the lower portion of the first coil spring 410, and allows or prevents the communication between the upper and lower chambers 101 and 102, while moving vertically along the outside of the central portion of the free piston 200.

That is, the ring disk 440 contacts the lower portion of the first coil spring 410, and vertically moves to the disk sheet 230 along the outer peripheral surface of the body 210 while interworking with the reciprocation of the piston rod 500.

The third coil spring 430 is mounted between the bottom of the ring disk 440 and the free piston 200 and elastically supports the ring disk 440.

That is, the first coil spring 430 is mounted on the sliding flange 220 and elastically supports the ring disk 440.

In this case, as described above, it is preferable that the communication hole 240 of the free piston 200 pass through the body 210 to communicate with the inside of the housing 100 and be disposed at a position lower than the upper portion of the disk sheet 230.

In this case, when the frequency of the piston rod 500 is in the high-frequency region, as shown in FIG. 1, the ring disk 440 contacts the disk sheet 230 and prevents the communication between the upper and lower chambers 101 and 102 of the housing 100. Therefore, the oil discharge to the outer peripheral surface and the lower side of the housing 100 is allowed.

That is, when the frequency of the piston rod 500 is in the high-frequency region, the force of the first coil spring 410 is stronger than the force of the third coil spring 430. Therefore, as shown, the variable frequency unit 400 maintains a state in which the ring disk 440 contacts the disk sheet 230.

In addition, when the frequency of the piston rod 500 is in the low-frequency region, as shown in FIG. 2, the ring disk 440 is separated from the disk sheet 230 and allows the communication between the upper and lower chambers 101 and 102 of the housing 100 through the communication hole 240. Therefore, the oil discharge to a part of the outer peripheral surface and the lower side of the housing 100 is allowed.

That is, when the frequency of the piston rod 500 is in the low-frequency region, the force of the third coil spring 430 is stronger than the force of the first coil spring 410. Therefore, as shown, the variable frequency unit 400 maintains a state in which the ring disk 440 is separated from the disk sheet 230 and the communication hole 240 is opened.

As described above, it is apparent that the holes 110 and 110' opening or closing the passage communicate at different heights according to the vertical movement of the free piston 200 interworking with the reciprocation of the piston rod 500 so as to enable the oil discharge from the outer peripheral surface of the housing 100.

In this case, all of the holes 110 and 110' communicate with the lower chamber 102 partitioned by the free piston 200.

That is, as in the conventional valve system, even though all of the holes 110 and 110' communicate with the lower chamber 102 partitioned by the free piston 200, a damping characteristic may be shown even in the high-frequency region of the piston rod 500 due to the structure of the ring disk 440 and the free piston 200 including the communication hole 240.

That is, when the frequency of the piston rod 500 is in the high-frequency region, the free piston 200 opens all of the holes 110 and 110' and allows the oil discharge to the outside of the housing 100.

In addition, when the frequency of the piston rod 500 is in the low-frequency region, the free piston 200 closes one hole 110' of the holes 110 and 110' or all of the holes 110 and 110' and reduces an amount of oil discharged to the outside of the housing 100.

As described above, the basic technical spirit of the present invention is to provide the frequency unit valve that is capable of maximally improve the vehicle ride comfort.

According to the present invention, the variable frequency unit closes the oil passage of the upper and lower chambers when the frequency of the piston rod is in the high-frequency region, and opens the oil passage of the upper and lower chambers through the free piston when the frequency of the piston rod is in the low-frequency region. Therefore, the damping force is provided in the entire frequency regions, thereby minimizing pressure pulsation and further improving the ride comfort.

While the embodiments of the present invention have been described with reference to the specific embodiments, it will be apparent to those skilled in the art that various changes and modifications may be made without departing from the spirit and scope of the invention as defined in the following claims.

What is claimed is:

1. A frequency unit valve comprising:
   a housing communicating with a piston rod and forming an inner space, both ends of the housing being opened;
   a free piston slidably mounted on an inner peripheral surface of the housing and partitioning the inner space of the housing into an upper chamber and a lower chamber;
   a sub-valve mounted in a lower portion of the housing and allowing oil to be passed to the outside of the housing according to the sliding of the free piston; and
   variable frequency units installed above and under the free piston, and configured to close an oil passage of the upper and lower chambers when a frequency of the piston rod is in a high-frequency region, and open the oil passage of the upper and lower chambers through the free piston when the frequency of the piston rod is in a low-frequency region,
   wherein the free piston comprises:
   a body having an opened lower side and forming an inner space, the body being configured to move vertically within the housing according to reciprocation of the piston rod;
   a sliding flange extending from an outer peripheral surface of the body and contacting the inner peripheral surface of the housing; and
   a disk sheet spaced apart from the outer peripheral surface of the body on the sliding flange and protruding in a ring shape,
   wherein the variable frequency units are installed above and under the body with reference to the sliding flange.

2. The frequency unit valve according to claim 1, wherein the free piston further comprises a communication hole that passes through the body to communicate with the inner space and is disposed at a position lower than an upper portion of the disk sheet, and
   an operating range of the variable frequency units installed above the body is from an upper portion of the body to the upper portion of the disk sheet.

3. The frequency unit valve according to claim 1, wherein the variable frequency units comprise:
   a first coil spring disposed between an inner upper portion of the housing and an upper portion of the body;
   a second coil spring disposed between an upper portion of the sub-valve and a lower portion of the body;
   a ring disk mounted in a lower portion of the first coil spring, and configured to allow or prevent mutual communication between the upper chamber and the lower chamber while moving vertically along an outside of a central portion of the free piston; and
   a third coil spring mounted between a bottom of the ring disk and the free piston, and configured to elastically support the ring disk.

4. The frequency unit valve according to claim 3, wherein the first coil spring is gradually widened toward an upper side.

5. The frequency unit valve according to claim 3, wherein the second coil spring is gradually widened toward a lower side.

6. The frequency unit valve according to claim 1, wherein the variable frequency units comprise:
   a first coil spring mounted in an inner upper portion of the housing and configured to elastically support the body from an upper side;

a second coil spring mounted in an inner lower portion of the housing and configured to elastically support the body from a lower side;

a ring disk contacting a lower portion of the first coil spring and vertically moving to the disk sheet along the outer peripheral surface of the body while interworking with reciprocation of the piston rod; and a third coil spring installed on the sliding flange, and configured to elastically support the ring disk.

7. The frequency unit valve according to claim 6, wherein the free piston further comprises a communication hole that passes through the body to communicate with the inside of the housing and is disposed at a position lower than an upper portion of the disk sheet, when the frequency of the piston rod is in the high-frequency region, the ring disk contacts the disk sheet and prevents mutual communication between the upper and lower chambers of the housing, and when the frequency of the piston rod is in the low-frequency region, the ring disk is separated from the disk sheet and allows mutual communication between the upper and lower chambers of the housing through the communication hole.

8. The frequency unit valve according to claim 6, wherein when the frequency of the piston rod is in the high-frequency region, a force of the first coil spring of the variable frequency units is stronger than a force of the third coil spring thereof.

9. The frequency unit valve according to claim 6, wherein when the frequency of the piston rod is in the low-frequency region, a force of the third coil spring of the variable frequency units is stronger than a force of the first coil spring thereof.

10. The frequency unit valve according to claim 6, wherein the first coil spring is gradually widened toward an upper side.

11. The frequency unit valve according to claim 6, wherein the second coil spring is gradually widened toward a lower side.

12. The frequency unit valve according to claim 1, wherein the housing comprises holes that open or close the passage at different heights according to the vertical movement of the free piston inter working with reciprocation of the piston rod, and all of the holes communicate with the lower chamber side partitioned by the free piston.

13. The frequency unit valve according to claim 12, wherein when the frequency of the piston rod is in the high-frequency region, the free piston allows all of the holes to be opened so that oil is discharged to the outside of the housing.

14. The frequency unit valve according to claim 12, wherein when the frequency of the piston rod is in the low-frequency region, the free piston closes a part or all of the holes so that an amount of oil discharged to the outside of the housing is reduced.

* * * * *